United States Patent Office 3,838,095
Patented Sept. 24, 1974

3,838,095
FOUNDRY SAND COATED WITH A BINDER
CONTAINING NOVOLAC RESIN AND UREA
COMPOUND
Calvin K. Johnson, Palos Heights, and Robert S. Craig, Hoffman Estates, Ill., assignors to CPC International Inc., Englewood Cliffs, N.J.
No Drawing. Filed Sept. 13, 1972, Ser. No. 288,605
Int. Cl. C08g 51/04
U.S. Cl. 260—38
13 Claims

ABSTRACT OF THE DISCLOSURE

A resin coated sand consisting essentially of (a) particles of sand coated with from about 1% to 8%, by weight of the sand, of phenol-formaldehyde novolak resin;
(b) a curing agent; and
(c) from about 1% to about 5%, by weight of the phenol-formaldehyde novolak resin, of a urea compound.

The sands are especially useful for forming foundry cores and molds.

BACKGROUND OF THE INVENTION

1. Field of the Invention

This invention relates to new and useful improvements in phenolic resin binders, to the novel process for applying these binders to discrete, inert solid particles, to the novel composition produced thereby, and to novel processes employ these compositions.

2. The Prior Art

Resin binders have been employed heretofore in the preparation of consolidated materials by bonding discrete inert solid particles such as sand, abrasive grit, wood chips, and a suitable binder.

The shell molding process for the production of sand mold sections for the casting of metals is well known in the prior art. While there are many variations of this process, the process essentially comprises depositing a combination of sand and potentially thermosetting resin against a heated pattern such that the resin if not a liquid, melts and cures to form a rigid shell mold section for use in the casting of metals. The combination of resin and sand used in the process can be a mixture of sand coated with liquid resin, or free flowing sand grains, each provided with a solid, nontacky coating of resin.

The production of a shell or mold involves two basic steps, the invest and the cure step. In the first step, the resin coated sand is dumped onto or blown against a heated metal pattern. The resin coated sand is held against the pattern (invested) until the shell is thick enough to hold metal in a given application. The time required for this operation is called the invest time. The faster the shell forms, the shorter the invest time can be. The rate at which the shell forms is known as the buildup rate. The faster the buildup rate, the shorter the invest time. If faster buildup rates can be attained, faster production cycles can be run. In the second step, the resin coated sand is dumped or dropped away from the shell of bonded coated particles of sand and the resulting shell is cured. After the shell is cured, it is removed from the hot metal pattern and is ready for use. Therefore, reducing the cure time required also can accelerate the production of shell cores of molds.

Phenolic resins are known to be particularly useful in the shell molding process. For shell molding, two-step phenol-formaldehyde resins (also known as novolaks) which are potentially thermosetting are employed. Thermoplastic phenol-formaldehyde novolak resins can be made potentially thermosetting by incorporating a curing agent such as hexamethylenetetramine. (Useful examples of potentially thermosetting phenolic resin coated sands are disclosed in U.S. Pats. 2,706,163 and 2,888,418.)

Foundry cores, and foundry molds can be formed by the shell process. Foundry cores can also be formed in other processes which can employ one-step phenol-formaldehyde resins (also known as resoles). Such processes employing one-step resins which are modified with urea have been disclosed. (See, for example, U.S. Pat. 3,306,-864 and 3,404,198.) The one-step resins, however, are not generally useful in the shell process. In addition, U.S. Pat. 3,215,585 discloses employing urea with phenolformaldehyde resin for use in the glass fiber art.

Resin coated sands exhibiting significantly increased buildup rate and/or cure rate in the shell process would be desirable in that such sands would permit shell cores and molds to be made at a faster rate. In this regard, the prior art shows that some effort has been made heretofore. For example, U.S. Pat. 3,471,443 discloses a potentially thermosetting phenol - formaldehyde novolak resin containing aniline which is reported to be fast curing. While this composition may be effective, aniline is not a completely desirable material for inclusion in a resin coated sand because it is toxic and has an unpleasant pungent odor.

A desirable binder composition for a resin coated sand would be a two-step phenol-formaldehyde novolak resin which exhibits both fast invest times and cure times.

SUMMARY OF THE INVENTION

In summary, it has been discovered that incorporating small amounts of urea compounds into sand coated with a potentially thermosetting phenol-formaldehyde novolak resin increases both the buildup rate and cure rate of the resin coated sand. Using these novel resin coated sands, both the invest time and cure time can be reduced when making cores and molds by the shell process. In addition, it has been found that the hot and cold tensile strengths of cores and molds made according to this invention are increased so that stronger cores and molds can be produced. Other significant advantages are noted hereinafter.

More specifically, this invention presents a resin coated sand consisting essentially of (a) particles of sand coated with from about 1% to 8%, by weight of the sand, of phenol-formaldehyde novolak resin (b) a curing agent; and (c) from about 1% to about 5%, by weight of the phenol-formaldehyde novolak resin, of a urea compound.

DETAILED DESCRIPTION OF THE INVENTION AND ITS PREFERRED EMBODIMENTS

This invention presents a resin coated sand consisting essentially of particles of sand coated with (a) from about 1% to 8%, by weight of the sand, of phenol-formaldehyde novolak resin; (b) a curing agent; and (c) from about 1% to about 5%, by weight of the phenol-formaldehyde novolak resin, of a urea compound.

Preferred resin coated sands especially useful in this invention are particles of sand, separate from adjacent particles, coated with from about 1% to about 6% by weight of a resin comprising a two-step (novolak) phenol-formaldehyde resin. While the coating resin can be either a liquid or a solid, the coating resin is preferably solid.

Methods for forming these preferred free-flowing resin coated sands are well known in the art, and such methods can be generally followed in the practice of this invention. A suitable phenol-formaldehyde novolak resin composition for use in this invention comprises an acid catalyzed phenol-formaldehyde resin formed by reacting phenol and formaldehyde in a molar ratio of from about 0.5 to about 0.85 mole of formaldehyde to mole of phenol in the presence of an acid catalyst, such as for example from about 0.4% to 0.8% of hydrochloric acid by weight of the phenol, or more when employing acids such as sulfuric or oxalic acids. The phenolic resin polymer formed in the process is conveniently brought to the desired stage of polymerization by heating the reactants, preferably at a temperature from about 35° C. to about 100° C., after which the acid catalyst is neutralized. Water in the resulting reaction mixture can be removed by evaporation under reduced pressure. A portion of the water can be removed to form a concentrated liquid resin product suitable for use in forming resin coated sand, or sufficient water can be removed such that the resin is a solid at room temperature (25° C.). The solid resin can be ground to a powder or flaked and the resulting resin solids can be used to form a preferred resin coated sand of this invention.

Generally, the process of coating sand with resin involves placing the sand in any one of several types of mixers commonly used in foundry work. Examples of these are: the Beardsley-Piper speed muller and the Simpson muller. To this sand is added from about 1% to about 8%, preferably 1% to 6%, by weight of sand, or the resin, and a suitable amount of curing agent, for example, hexamethylenetetramine to render the novolak resin potentially thermosetting. An amount of curing agent suitable for rendering the resin thermosetting is from about 8% to about 20% by weight of the resin. The components are heated to a suitable mixing temperature and mixed to coat each of the sand grains with a layer of the resin and curing agent. After the sand is coated with resin, the coated sand is cooled to room temperature, as for example by quenching with water. The mixing is continued for a sufficient time to obtain a free-flowing product.

In accordance with this invention, from about 1% to about 5%, preferably from about 1½% to about 3½%, by weight of the phenolformaldehyde novolak resin, of a urea compound is incorporated into the resin coated sand. It has been surprisingly found that incorporating the urea compound in the resin coated sand provides resin coated sands which exhibit faster buildup rates, i.e., shorter invest times, and faster cure rates. These novel sands, therefore, are especially useful for rapidly forming molds and cores in the shell process.

Suitable urea compounds for use in this invention are urea, alkylene urea, mono- and di-alkyl urea, wherein the alkylene group contains from 2 to 3 carbon atoms and the alkyl group contains from 1 to 3 carbon atoms. The preferred urea compounds for use in this invention are urea compounds selected from the group consisting of urea, ethylene urea and propylene urea. Urea is most preferred.

The urea compound can be incorporated into the novel resin coated sand of this invention in a variety of ways. For example, the urea compound can be dispersed or dissolved in the phenol-formaldehyde novolak resin prior to adding the resin to the sand. In another method, the urea compound can be dissolved in the quench water, which can also contain hexamethylenetetramine, and added to the resin coated sand.

The incorporation in the resin coated sand of the urea compound unexpectedly causes the resin to cure more rapidly and causes the resin coated sand to build up faster in the shell process. In addition, it has been found that cores and molds made in the shell process with the novel resin coated sand of this invention exhibit higher hot and cold tensile strengths.

It is often the practice in the foundry art to include a variety of adjuvants in resin coated sands, as for example, waxy compounds such as calcium stearate and bis-stearoxylamide of ethylenediamine, salicylic acid, clay, iron oxide and lignin-type resins. Such adjuvants can also be especially useful in the resin coated sands of this invention.

The novel rapid process for forming molds according to this invention involves bringing the novel resin coated sand of this into contact with a hot metal pattern to form a mold suitable for casting metal, curing the mold and removing the mold from the pattern. The temperatures and procedures involved in forming the molds are those generally employed in the art, as for example, as disclosed in U.S. Pat. 3,004,312, incorporated herein by reference.

More particularly this invention provides a process for forming foundry cores and molds comprising the steps of (1) contacting a hot pattern with a free flowing resin coated sand consisting essentially of (a) particles of sand coated with from about 1% to 8%, by weight of the sand, of phenol formaldehyde novolak resin; (b) a curing agent; and (c) from about 1% to about 5%, by weight of the phenol formaldehyde novolak resin, of a urea compound selected from the group consisting of urea, ethylene urea, propylene urea and mixtures thereof; (2) holding the resin coated sand against the hot pattern to bond a portion of the particles of resin coated sand together to form a foundry mold or core of suitable thickness; (3) removing unbonded particles of resin coated sand from bonded particles of sand forming the foundry mold or core; (4) curing the foundry mold or core, the hot pattern having a temperature of from about 350° F. to 600° F.; and (5) removing the foundry mold or core from the pattern. Preferably the resin coated sand employed in the process is a preferred resin coated sand of this invention described hereinbefore, and preferably the temperature of the hot pattern is from about 400° F. to 550° F. The pattern is preferably metal.

The following examples particularly illustrate several preferred embodiments of the invention and the improvements resulting therefrom.

EXAMPLE I

A phenol-formaldehyde novolak resin is formed in the following manner. A charge of 1,000 parts of phenol and 7 parts of 50% sulfuric acid is placed in a reactor. The temperature of the mixture is raised to 100% C., and 650 parts of aqueous 37% by weight formaldehyde are slowly added to the mixture. After the formaldehyde is completely added, the resulting mixture is refluxed for 45 minutes to form a phenolic resin. A lime slurry comprising 3 parts lime and 7 parts water is then added to this mixture to neutralize the surfuric acid. The resulting resin product is dehydrated and cooled. Adjuvants comprising 5%, by weight, calcium stearate and 3%, by weight salicylic acid are added to the resin. The resin is then converted to a flake by passing it through a roll mill equipped with cooled stainless steel rollers.

A series of resin coated sands designated as coated sands A, B and C were prepared in the following manner. A quantity of Wedron 7020 foundry sand was heated to 130° C. and added to a 100 pound capacity Simpson Porto Muller. A quantity of the above flake resin product was added to the muller and the mixture of resin and sand mulled for 90 seconds to melt the flake and coat it onto the sand. Then a solution comprising a quantity of hexamethylenetetramine and a quantity of urea compound in water was added to the muller. Mulling was continued until the mixture broke up into free flowing grains of resin coated sand. The coated sand was then discharged from the muller. The quantities and compounds involved in the formulation of each of the coated sands are given in Table I below.

Coated Sand A:

TABLE I

| | | |
|---|---|---|
| Resin | gm | 1331 |
| Sand | lbs | 100 |
| Hexa* | gm | 192 |
| Water | ml | 800 |
| Urea | | none |

TABLE I—Continued

Coated Sand B:
- Resin _____ gm__ 1331
- Sand _____ lbs__ 100
- Hexa* _____ gm__ 192
- Water _____ ml__ 800
- Urea _____ gm__ 34

Coated Sand C:
- Resin _____ gm__ 1331
- Sand _____ lbs__ 100
- Hexa* _____ gm__ 192
- Water _____ ml__ 800
- Ethylene _____ —
- Urea _____ gm__ 34

Resin coated sand A contains no urea, and is not an example of the invention but is presented for comparison. Resin coated sands B and C are examples of the invention presented herein.

Part A

The cold tensile and hot tensile of each of the sands were determined as follows:

The hot tensile strengths were determined by use of a Dietert No. 365 Hot Shell Tensile Tester. Tests were run at 450° F. with a 3 minute cure time.

The cold tensiles were determined by making ¼ inch thick dog bone test briquets in a Dietert No. 363 Heated Shell Curing Accessory. The test briquets were cured for 3 minutes at 450° F. and allowed to cool to room temperature. The cold tensile of the briquets was then determined by using a 401 Universal Sand Strength Tester in the manner set forth by the American Foundryman's Society.

The results of the tests are as follows:

| Coated sand | A | B | C |
|---|---|---|---|
| Cold tensile (p.s.i.) | 495 | 540 | 520 |
| Hot tensile (p.s.i.) | 307 | 370 | 31* |

Resin coated sands B and C of the invention exhibit desirably higher cold and hot tensiles than resin coated sand A, a prior art resin coated sand.

Part B

A quantity of each of the sands produced was placed in the dump box of a Shalco shell molding machine and the shell mold heated to 500° F. The coated sand was dumped (invested) against the hot mold for various lengths of invest time. The weight of the shell formed was determined to measure the relative rate of buildup of each of the coated sands. A heavier shell formed in a given time indicates a faster buildup rate. The results are as follows:

| Shell buildup at 500° F. | Coated sand A (no urea), lbs. | Coated sand B (2.5% urea), lbs. | Coated sand C (2.5% ethylene urea), lbs. |
|---|---|---|---|
| 30 sec. invest | 8 | 8½ | 8½ |
| 120 sec. invest | 14½ | 15¼ | 14¾ |

The coated sands of the invention containing a urea compound, coated sands B and C, exhibit a better buildup than coated sand A, which is presented for comparison and is not an example of the invention.

Part C

A quantity of each of the coated sands was blown into an electrically heated core box using a Redford core blower. The core box temperature was 420° F. The blowing pressure was 80 p.s.i. one inch thick dog bone shaped test cores were formed and removed from the core box at given times and the tensile strengths measured immediately using a Dietert 401 universal sand strength machine. The higher hot tensiles indicate faster cure.

HOT TENSILES OF BLOWN CORES
(pounds per square inch)

| | Coated sand B (No urea) | Coated sand B (2.5% urea) | Coated sand C (2.5% ethylene urea) |
|---|---|---|---|
| Cure time, sec.: | | | |
| 30 | 46 | 62 | 50 |
| 20 | 28 | 45 | 48 |
| 15 | 22 | 31 | 27 |
| 10 | 15 | 19 | 19 |

As can be seen the coated sands of the invention, coated sands B and C give faster cures when blown in a core box than coated sand A, a conventional prior art coated sand.

EXAMPLE II

A resin coated sand of the invention wherein the urea is incorporated with the novolak resin at the start of the mulling cycle is prepared as follows:

A quantity of Wedron 7020 foundry sand was heated to 130° C., and added to a laboratory muller. A quantity of the flake resin product of Example I and urea were added to the muller and the mixture of resin, urea and sand mulled for 90 seconds to melt the flake and coat it onto the sand. Then a solution comprising a quantity of hexamethylenetetramine in water was added to the muller. Mulling was continued until the mixture broke up into free flowing grains of coated sand. The coated sand was then discharged from the muller. The resin coated sand was designated as "coated sand D."

For comparison purposes a resin coated sand not within the scope of the invention was prepared in the same manner as coated sand D except that no urea was added. This resin coated sand was designated as "coated sand E."

The quantities and compounds involved in the formulation of each of the coated sands are given in the table below.

| Coated sand | D | E |
|---|---|---|
| Resin, gm | 29.25 | 30 |
| Urea, gm | .75 | ---- |
| Sand, gm | 1,000 | 1,000 |
| Hexa solution, ml.* | 14.35 | 14.35 |

*An aqueous solution containing 40% by weight hexamethylenetetramine.

These sands were tested in the manner described in Example I. The results were as follows:

| Coated sand | D | E |
|---|---|---|
| Test: | | |
| Cold tensile (p.s.i.) | 467 | 317 |
| Blown cores,* hot tensile (p.s.i.): | | |
| 30 sec. cure | 33 | 32 |
| 20 sec. cure | 26 | 22 |
| 15 sec. cure | 24 | (¹) |

¹ Core too weak to test.
*Test procedure identical to that given in Example I, Part C.

EXAMPLE III

A resin coated sand of the invention wherein the urea is premixed with phenol-formaldehyde novolak resin prior to being coated on sand is prepared as follows:

To a 5000 ml. 3 neck flask fitted with a reflux condenser, stirring motor and stirrer, thermometer and heating mantle was added 1000 gm. of the flake resin employed in Example I and the temperature was slowly raised to 250° F. with stirring. When the resin is substantially melted, 25 gm. of urea are added to the resin and stirred for 2 hours and the resulting resin product is cooled and converted to flakes by passing it through a roll mill equipped with cooled stainless steel rollers.

One thousand grams of Wedron 7020 foundry sand were heated to 130° C. and added to a laboratory muller. Thirty grams of the abovementioned flake resin product was added to the muller and the mixture mulled for 90 seconds to melt the flake and coat it onto the sand. Then a solution comprising a quantity of hexamethylenetetramine in water was added to the muller. Mulling was continued until the mixture broke up into free flowing grains of coated sand. The coated sand was then discharged from the muller. This resin coated sand is substantially the same as the resin coated sands of the invention discussed in Examples I and II in that it exhibits a fast buildup rate, fast cure, and good cold and hot tensiles.

EXAMPLE IV

Resin coated sand of the invention was prepared in 1500 lb. capacity Beardsley and Piper Speed Muller as follows. Fifteen hundred pounds of 70AFS fineness lake sand was preheated to 280° F. and added to the muller. Then 62 lbs. 2 oz. of flake resin of Example I were added and mulling continued for 75 seconds to coat the resin onto the sand. Then a quench solution comprised of 9.6 lbs. of hexamethylenetetramine and 1 lb. 10 oz. of urea dissolved in 26.3 lbs. of water was added. Mulling and cooling were continued until the coated sand broke down to a free flowing material. The free flowing coated sand was discharged from the muller.

A similar resin coated sand was prepared in the same manner except that no urea was added. This sand was designated as "Control Sand." This resin coated sand is not an example of the invention, but is presented for comparison purposes.

Molds were prepared in a foundry on a Hutchinson Shell Mold Machine. Metal pattern temperature was 500° F. Cure times and invest times of the resin coated sand with urea were compared to the control sand which had no added urea. The results were as follows:

Control sand
  Invest Time—25 sec. Mold Wt.—22 lbs.
Resin coated sand with urea
  Invest Time—25 sec. Mold Wt.—26 lbs.
  Invest Time—20 sec. Mold Wt.—22 lbs.

This data shows that when employing resin coated sand of the invention in the shell process the invest time can be reduced 5 seconds (20%) as compared with the prior art "control sand" in order to obtain the same mold weight as the control.

Minimum cure times were also compared. The minimum cure time is the time required for molds to attain sufficient strength such that they can be removed from a mold machine without breaking or warping.

Minimum cure time                               Sec.
  Control sand _____  40
  Resin coated sand with urea _____ 35

The cure time was successfully reduced by 5 seconds (12.5%) with the sand containing urea. The total cycle was reduced from 65 seconds to 55 seconds, a 15.4% reduction in time required to make a shell mold having the same weight as the control.

What is claimed is:
1. A resin coated sand consisting essentially of
   (a) particles of sand coated with from about 1% to 8%, by weight of the sand, of phenol formaldehyde novolak resin;
   (b) a curing agent; and
   (c) from about 1% to about 5%, by weight of the phenol formaldehyde novolak resin, of a urea compound selected from the group consisting of urea, ethylene urea, propylene urea and mixtures thereof.

2. The resin coated sand of Claim 1 wherein the curing agent is hexamethylenetetramine.
3. The resin coated sand of Claim 2 containing from about 1½% to about 3½%, by weight of formaldehyde novolak resin, of urea compound.
4. The resin coated sand of Claim 3 wherein the urea compound is urea.
5. The resin coated sand of Claim 3 wherein the urea compound is ethylene urea.
6. The resin coated sand of Claim 4 wherein the particles of sand are coated with from 1% to 6%, by weight of the sand, of phenol formaldehyde novolak resin.
7. A process for forming foundry cores and molds comprising the steps of
   (1) contacting a hot pattern with a free flowing resin coated sand consisting essentially of
      (a) particles of sand coated with from about 1% to 8%, by weight of the sand, of phenol formaldehyde novolak resin;
      (b) a curing agent; and
      (c) from about 1% to about 5%, by weight of the phenol formaldehyde novolak resin, of a urea compound selected from the group consisting of urea, ethylene urea, propylene urea and mixtures thereof;
   (2) holding the resin coated sand against the hot pattern to bond a portion of the particles of resin coated sand together to form a foundry mold or core of suitable thickness;
   (3) removing unbonded particles of resin coated sand from bonded particles of sand forming the foundry mold or core;
   (4) curing the foundry mold or core, the hot pattern having a temperature of from about 350° F. to 600° F.; and
   (5) removing the foundry mold or cure from the pattern.
8. The process of Claim 7 wherein the curing agent is hexamethylenetetramine.
9. The process of Claim 8 wherein the resin coated sand contains from about 1½% to about 3½%, by weight of formaldehyde novolak resin, of urea compound.
10. The process of Claim 9 wherein the urea compound is urea.
11. The resin coated sand of Claim 9 wherein the urea compound is ethylene urea.
12. The process of Claim 9 wherein the particles of sand are coated with from 1% to 6%, by weight of sand, of phenol formaldehyde novolak resin.
13. The process of Claim 12 wherein the temperature is from about 400° F. to 550° F.

References Cited
UNITED STATES PATENTS

| | | | |
|---|---|---|---|
| 2,888,418 | 5/1959 | Albonese et al. | 260—38 X |
| 3,215,585 | 11/1965 | Kneipple | 260—29.3 |
| 1,892,848 | 1/1933 | Ostersetzer et al. | 260—57 R |
| 3,525,379 | 8/1970 | Johnson et al. | 260—59 X |
| 3,663,486 | 5/1972 | Keutgen | 260—38 X |

ALLAN LIEBERMAN, Primary Examiner

S. M. PERSON, Assistant Examiner

U.S. Cl. X.R.
164—43; 260—DIG. 40.